(12) United States Patent
Leidlein et al.

(10) Patent No.: US 6,581,647 B1
(45) Date of Patent: Jun. 24, 2003

(54) MOBILE DRUMMING APPARATUS AND METHOD

(76) Inventors: Hugh Leidlein, 215 Huckleberry, Lake Jackson, TX (US) 77566; Troy Calvert, 211 Tea Rose La., Lake Jackson, TX (US) 77566

( * ) Notice: Subject to any disclaimer, the term of this patent is extended or adjusted under 35 U.S.C. 154(b) by 0 days.

(21) Appl. No.: 09/451,819

(22) Filed: Nov. 30, 1999

(51) Int. Cl.$^7$ .............................. B65B 1/04; B65B 3/04
(52) U.S. Cl. ..................... 141/2; 141/129; 141/165; 141/168; 141/171; 141/5; 141/7; 53/282; 53/468; 53/510
(58) Field of Search ................. 141/129, 164–172, 141/2, 4, 5, 7, 8; 53/167, 282, 425, 468, 510

(56) References Cited

U.S. PATENT DOCUMENTS

| | | |
|---|---|---|
| 3,952,698 A | 4/1976 | Beyer et al. |
| 3,977,154 A | 8/1976 | Kamisaka et al. |
| 3,994,117 A * | 11/1976 | Kinney ........................... 53/77 |
| 4,018,026 A | 4/1977 | Kamisaka et al. |
| 4,059,134 A | 11/1977 | Violette |
| 4,211,263 A | 7/1980 | Kennedy et al. |
| 4,324,264 A | 4/1982 | Kruger et al. |
| 4,337,802 A | 7/1982 | Kennedy et al. |
| 4,494,583 A | 1/1985 | Reeves, Jr. et al. |
| 4,506,489 A | 3/1985 | Schieser et al. |
| 4,520,853 A | 6/1985 | Niese et al. |
| 4,608,809 A | 9/1986 | Francis et al. |
| 4,703,780 A | 11/1987 | Reeves, Jr. et al. |
| 4,735,238 A | 4/1988 | Reeves, Jr. et al. |
| 4,804,024 A | 2/1989 | Arnemann |
| 4,875,420 A | 10/1989 | Hay et al. |
| 4,880,021 A | 11/1989 | Haberstroh |
| 4,942,958 A | 7/1990 | Marttila |
| 5,016,688 A * | 5/1991 | Suzuki et al. ................ 141/170 |
| 5,371,911 A | 12/1994 | Mullinax |
| 5,605,094 A | 2/1997 | Besnier |
| 5,727,474 A | 3/1998 | Theurer et al. |
| 5,803,701 A | 9/1998 | Filiberti et al. |

FOREIGN PATENT DOCUMENTS

| | | |
|---|---|---|
| FR | 2394415 | 12/1979 |
| GB | 1141930 | 2/1969 |
| SU | 1222594 | 7/1986 |

* cited by examiner

Primary Examiner—Timothy L. Maust
(74) Attorney, Agent, or Firm—Mark R. Wisner

(57) ABSTRACT

A drumming unit that utilizes a computer controlled drum filling and drum handling system. Drum handling and filling is fully automated, the drums being introduced onto the apparatus on an inlet conveyor, loaded from the inlet conveyor onto a frame at which a plurality of work stations are provided for removing the bung from the drum, filling the drum, and replacing the bung in the drum, and then unloading the drum from the frame onto an outlet conveyor. A hose from the chemical plant, warehouse, or other facility is utilized for filling operations that stays in the facility, thereby preventing reactive chemical and quality concerns. A vapor tight wall is provided to isolate the operator from the filling operations, thereby eliminating the need for a slicker suit, respirator, or other safety equipment. The drumming unit is preferably mounted to a base which is sized to fit onto the bed of a truck or trailer so that the unit can be moved from one location to another for drumming operations.

19 Claims, 6 Drawing Sheets

MOBILE DRUMMING APPARATUS AND METHOD

BACKGROUND OF THE INVENTION

The present invention relates to an apparatus and method for filling drums and other containers which is conveniently transported from one location to another for on-site filling. In more detail, the present invention relates to a mobile drum filling apparatus, and a method of filling multiple drums in continuous, automated fashion using an apparatus, which is entirely self-contained such that the drums are conveniently filled at any location.

Low volume products which can be handled like a fluid, e.g., liquids and small pellets or the like which can be pumped, are typically loaded into containers such as 55 gallon drums using a flexible hose with a manual on-off valve that is held by an operator over a four drum platform scale for filling four drums on a pallet. The facility may be provided with an inlet and/or outlet conveyor and sometimes a tarp or other makeshift containment structure may be utilized, but as a rule, such operations are poorly equipped and labor intensive, and therefore costly. Further, because of the lack of vapor and liquid containment facilities, such operations are potentially dangerous to the immediate operator(s) and to the environment in general.

There is, therefore, a need for a drum filling apparatus which overcomes these limitations of cost and danger, and specifically, an apparatus that can be utilized for quickly and reliably filling such drums, and it is an object of the present invention to provide such an apparatus.

It is also an object of the present invention to provide an apparatus that is conveniently moved from one location to another to conduct drum filling operations at various sites as needed.

It is also an object of the present invention to provide a method of filling containers such as drums utilizing such an apparatus.

Other objects, and the advantages, of the method and apparatus of the present invention will be made clear to those skilled in the art by the following description of a presently preferred embodiment thereof.

SUMMARY OF THE INVENTION

These objects are achieved by providing an apparatus for filling a container with a flowable material comprising a base with inlet and outlet conveyors mounted on the base. An elongate frame is mounted to the base and the frame includes means for performing the operations of (1) positioning the opening of a container for introducing a flowable material into the container, (2) introducing the flowable material into the container through the opening, and (3) closing the container having the flowable material therein, and each of these three operations is performed at a different station on the frame. The frame is also provided with means for moving the container from one station on the frame to another and means for moving the container to be filled onto and off of the frame. In a preferred embodiment described herein, the base is mounted to a vehicle so that it is conveniently moved from one location to another. To facilitate the mobility of the filling apparatus of the present invention, in a particularly preferred embodiment, the inlet and outlet conveyors are positioned at angles to the frame and the angles are approximately right angles. The positioning of the inlet and outlet conveyors at right angles to the frame allows the base of the filling apparatus to be mounted to a vehicle of relatively small size and, therefore, increased mobility.

DETAILED DESCRIPTION OF THE PREFERRED EMBODIMENT

Figure 1:
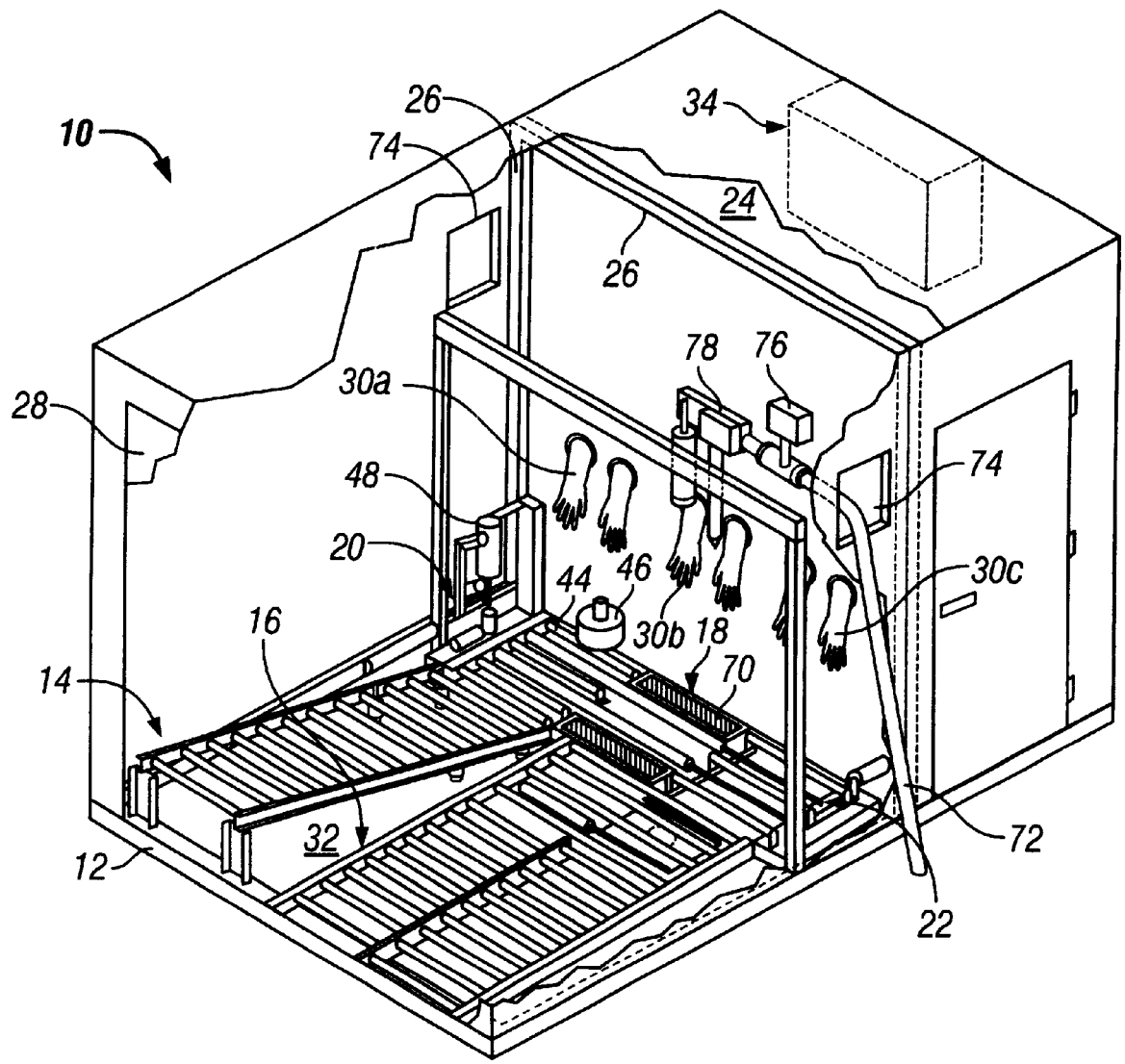
FIG. 1 is a perspective, partially schematic view of a preferred embodiment of a filling apparatus constructed in accordance with the teachings of the present invention.
Figure 2:
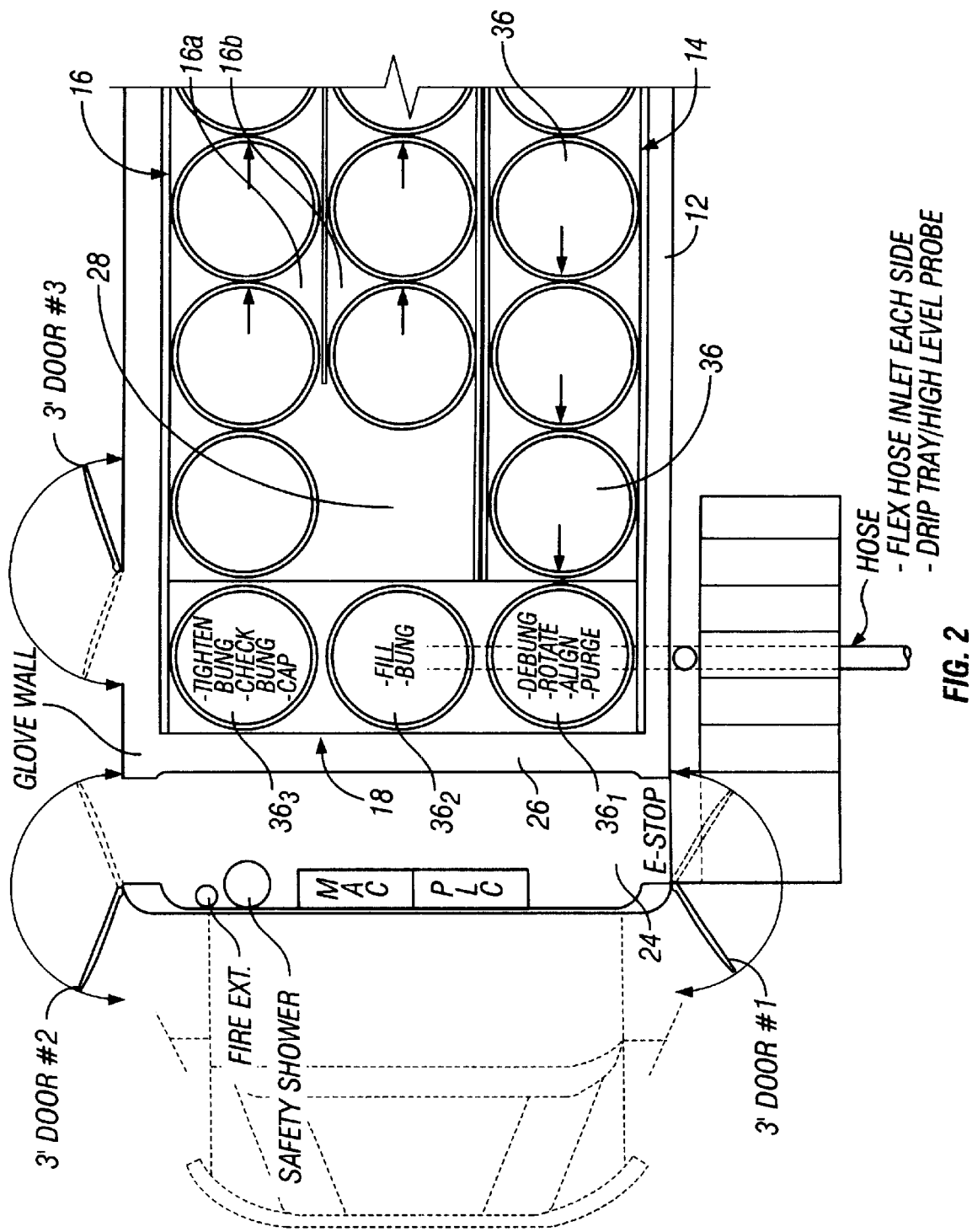
FIG. 2 is a schematic, top plan view of the filling apparatus of FIG. 1.
Figure 5:
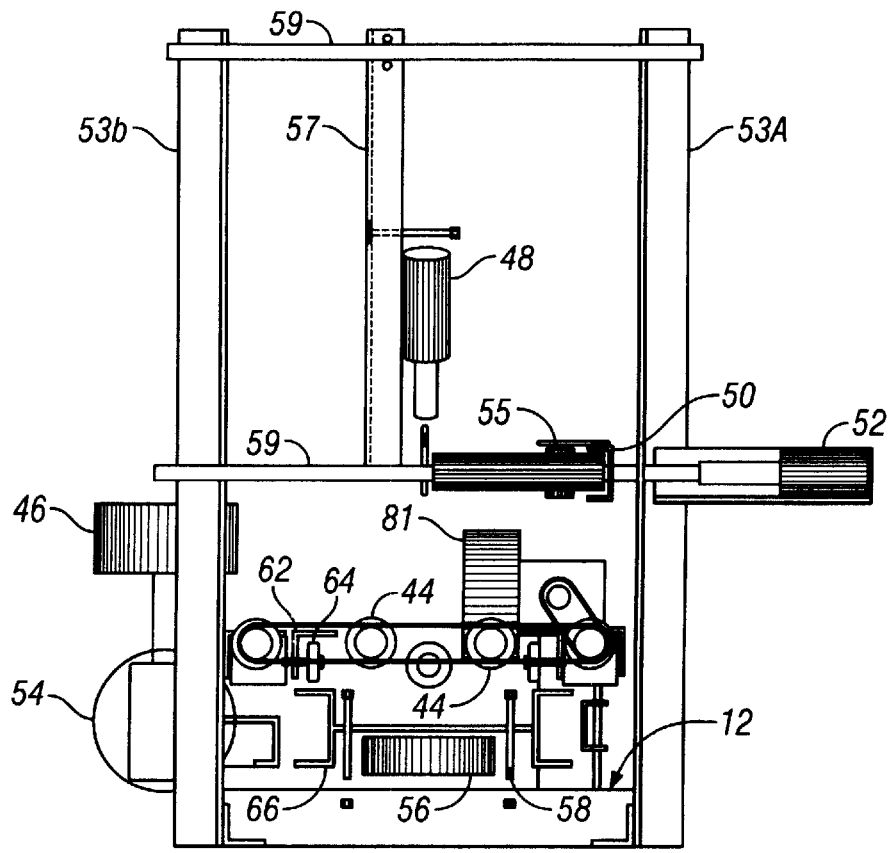
FIG. 5 is an end elevational view of the frame and carrier of the filling apparatus of FIG. 1.
Figure 6:
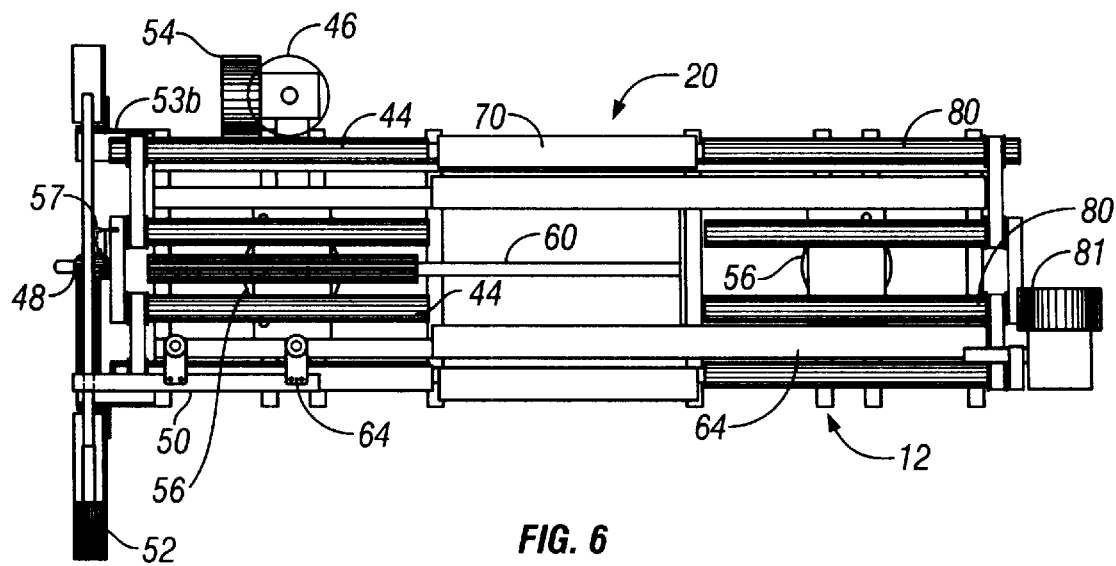
FIG. 6 is a top plan view of the frame and carrier of FIG. 1.
Figure 7:
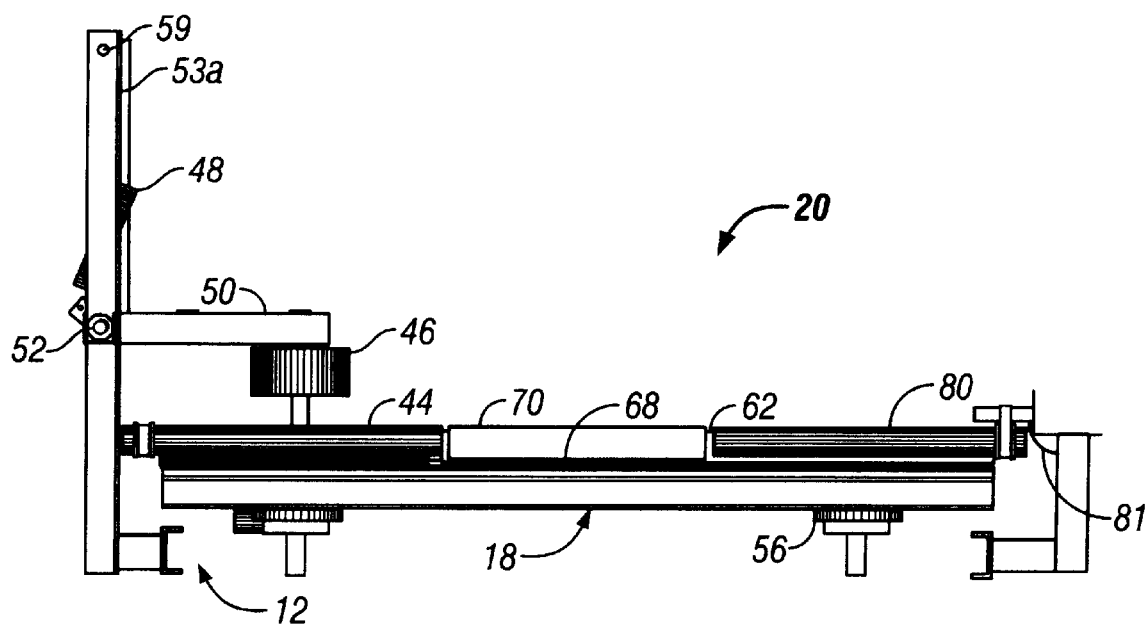
FIG. 7 is a side elevational view of the frame and carrier of the filling apparatus of FIG. 1.
Figure 8:
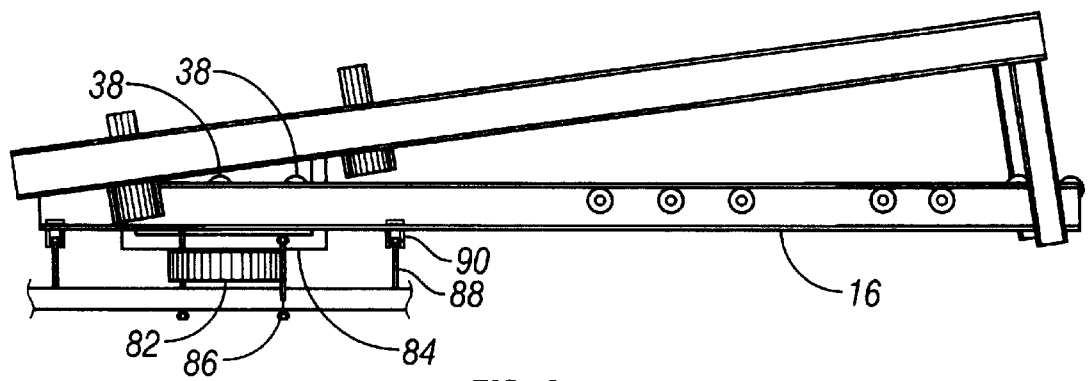
FIG. 8 is a side elevational view of the outlet conveyor of the filling apparatus of FIG. 1.

Referring to FIG. 1, a preferred embodiment of an apparatus for filling a container with a flowable material constructed in accordance with the teachings of the present invention is indicated generally at reference numeral 10. Filling apparatus 10 is comprised of a base 12 having inlet and outlet conveyors 14, 16 mounted thereto. An elongate frame 18 is mounted to base 12 and is provided with means, indicated generally at reference numeral 20 in FIGS. 4 and 5, for moving a container to be filled from one station on the frame to another and means, indicated generally at reference numeral 22 in FIGS. 4 and 6, for moving the container onto and off of frame 18. As best shown in FIGS. 1 and 2, inlet and outlet conveyors 14 and 16 are mounted to base 12 at an angle which is approximately a right angle to frame 18 such that base 12, having conveyors 14, 16 and frame 18 mounted thereto, is compact and is therefore adapted to fit a relatively short wheelbase truck (not shown), trailer, or similar vehicle to facilitate moving filling apparatus 10 from one location to another. In a second preferred embodiment (not shown), base 12 comprises a skid for mounting to a trailer, railroad car, the deck of a boat or ship, or any other suitable surface for movement of base 12 from one location to another.

Also mounted to base 12 is a work area for the operator of filling apparatus 10, indicated generally at reference numeral 24. Work area 24 is provided with a vapor tight wall 26 between the drum filling area, indicated generally at 28 in FIG. 1, including three sets of gloves 30A, 30B, and 30C at each of three stations along frame 18 for a purpose to be described below. A sump 32 is provided on base 12 for secondary material containment and an explosion proof vent blower (not shown) is mounted in the roof of the drum filling area 28 for additional personnel safety and environmental protection. Also included in work area 24 is the control panel and electronics, indicated generally at reference numeral 34, for controlling the operation of drum filling apparatus 10. Those skilled in the art will recognize that the method and apparatus described herein are suitable for use in filling almost any type of container. However, so far as is known, the containers most likely to be filled using the method and apparatus of the present invention are 55 gallon drums. For that reason, the invention is described herein by referring to such drums.

Figure 3:
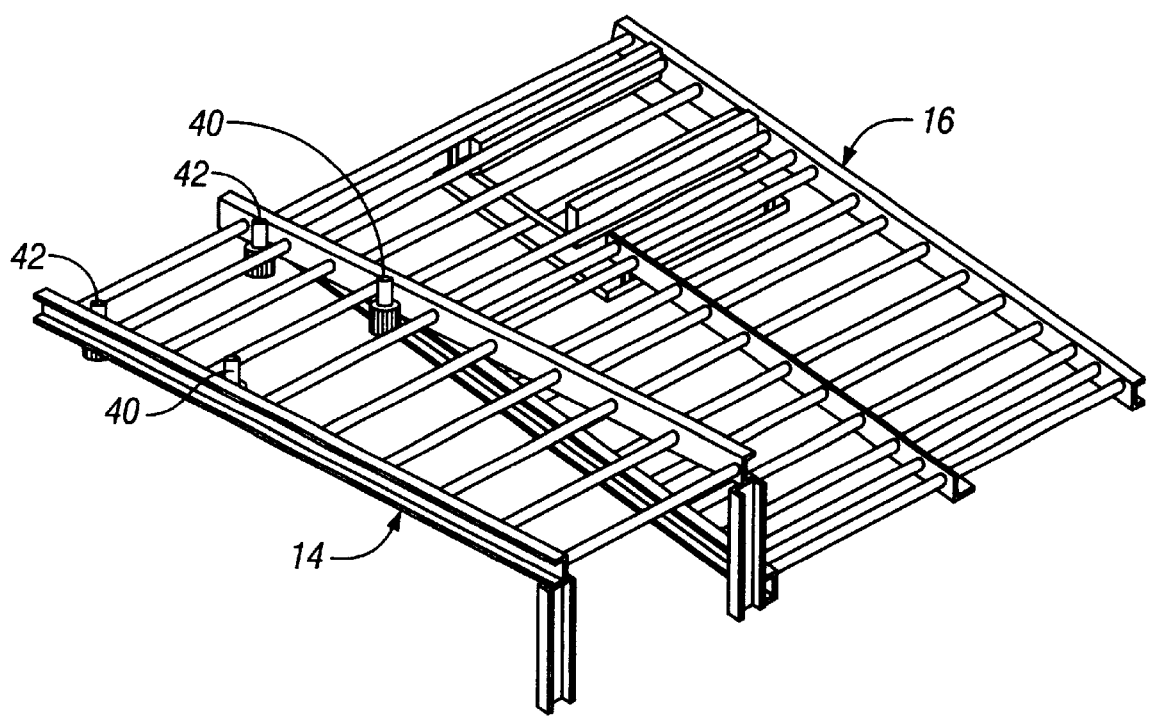
FIG. 3 is a perspective view of inlet and outlet conveyors of the filling apparatus of FIG. 1.

Referring now to FIG. 2, the operation of the filling apparatus 10 will now be described. Empty drums 36 are loaded onto inlet conveyor 14, which is inclined as shown in FIGS. 1 and 3, and roll down the incline on rollers 38 and onto frame 18. As a drum rolls onto frame 18, and as will be described in more detail below, it is positioned at a first station in which it is rotated so that the bung can be removed by automated machinery for that purpose and it is then purged with an inert gas such as nitrogen. The frame 18 is provided with means for moving the drum from this first station to second and third stations, and a scale is located under the second station. It is this second station at which the drum is filled with the flowable product and the bung is then replaced on the drum. At the third station, the bung is tightened and checked and a cap is added, and the drum is then moved onto the outlet conveyor 16. In the preferred embodiment shown, outlet conveyor 16 is comprised of side-by-side "A" and "B" conveyors and filled drums are moved from the "A" conveyor to the "B" conveyor as needed so as to provide a "four pack" of drums at the end of outlet conveyor 16 for off-loading by a fork lift truck equipped with a conventional four head drum picker.

Figure 4:
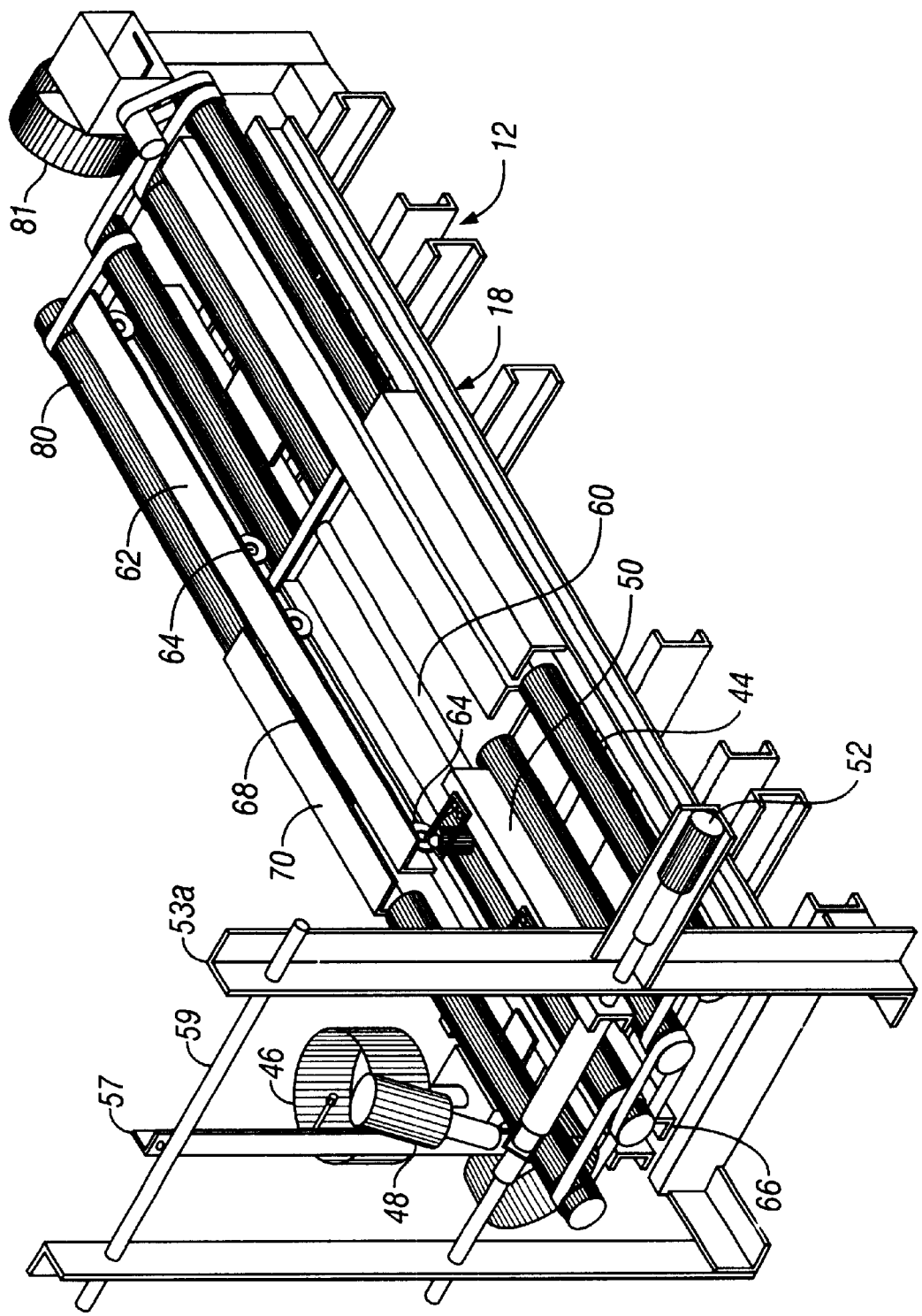
FIG. 4 is a perspective view of the frame and carrier of the filling apparatus of FIG. 1.

The inlet and outlet conveyors 14 and 16 are shown in more detail in FIG. 3. Inlet conveyor 14 is provided with primary and secondary drum stops 40 and 42, each comprised of a hydraulic piston, which work in alternating fashion to index and separate a single drum 36 from the group of drums which roll down inlet conveyor 14 (see FIG. 2). When the stops 42 are lowered, the weight of the drums 36 on inlet conveyor 14 tends to force the drum closest to frame 18 toward frame 18, and when stops 40 are lowered, the drum closest to frame 18 rolls down onto a set of powered rollers 44 (see FIG. 4) mounted to frame 18, the rollers 44 comprising a portion of the above-described means 22 for moving a container onto and off of frame 18. Stops 40 raise up when cleared by that drum to prevent more than one drum 36 from rolling down onto the powered rollers 44. The set of powered rollers 44 position the drum at the above-described first station, forward motion stopping when the drum contacts the drum rotator 46 (the drum $36_1$ shown in FIG. 2 is positioned at this so-called first station). Pivot piston 48 is then actuated to lower the compression arm 50 from a first, raised position allowing the drum to pass to a second, lowered position behind the drum, compression arm 50 pivoting on the axis of compression piston 52, which is journaled in the uprights 53A and 53B as shown in FIG. 4. Compression piston 52 pushes compression arm 50, having a pair of compression rollers 55 mounted thereto, against the drum to hold the empty drum against the rotator 46. Drum rotator 46 is powered by a gearbox and motor, indicated generally at reference numeral 54, and spins the empty drum against compression rollers 55 until it is positioned so that a conventional hydraulically- or air-activated bung remover (not shown) can access, unscrew, and lift the bung from the drum at the above-described first station. Activation of compression piston 52 causes the entire drum compression assembly (comprised of pivot piston 48, compression arm 50, and the reaction arm 57 against which pivot piston 48 bears to pivot the compression arm 50) to travel back and forth along the track formed by bars 59A and 59B mounted to uprights 53A and 53B.

In a particularly preferred embodiment, this operation is fully automated, the bung remover being lowered by hydraulics or compressed air when signaled by appropriate position sensing equipment (not shown) under control of a programmable logic controller. As shown at reference numeral 34, the preferred embodiment of the drum filling apparatus of the present invention includes a control panel and that control panel is provided with suitable controls for operating a programmable microprocessor for sequencing this operation. Note also that, as shown in FIG. 1, the vapor-tight wall 26 is provided with a set of gloves 30A at this first station such that the drum can be rotated and de-bunged manually. Indeed, in one preferred embodiment of the present invention, all of the above-described handling of drums 36 is accomplished under the control of an operator utilizing suitable valves and switches. Regardless of whether drum positioning, rotating, and debunging is automated or accomplished manually, after the bung has been removed from the drum at this first station, the compression arm 50 retracts from the second, lowered position to the original, raised position.

Under operator control of the control of the programmable microprocessor operably connected to control panel 34, the lifting balloons 56 (best shown in FIGS. 5 and 6) are inflated to the height of the balloon stops 58, thereby lifting the drum clear of the powered rollers 44. Carrier piston 60 is then retracted so that the drum carrier 62 is pulled under the drum on the bearings 64 running on the rails 66 mounted to frame 18. The lifting balloons 56 then deflate to lower the drum onto drum carrier 62 and carrier piston 60 is extended to position the drum on the second of the three stations on frame 18, the load cell, which is indicated generally at reference numeral 68, the drum being lowered onto the scale plate 70. Again, automated or manually-controlled filling operations are conducted at this second station on frame 18, specifically, the filling of the drum $36_2$ at the second position as shown in FIG. 2. The scales (not shown) to which scale plate 70 are connected provide an output signal to the programmable logic controller connected to control panel 34 (or to a visual output display for reading by an operator) indicating that the drum $36_2$ has been filled to the desired level. As shown schematically in FIG. 1, the filling equipment comprises an inlet hose 72 which extends through an access port 74 in the walls of the drum filling area 28, on-off valve 76, and retractable nozzle 78, all of a type known in the art. While the drum $36_2$ is filled, a new drum $36_2$ is introduced at the first, rotator station.

After the drum is filled, a bung (not shown) is inserted into the drum and then the station-to-station moving means 20 repeats the above-described cycle, moving the filled drum $36_2$ to the third station on frame 18 (the third station is represented by the drum $36_3$ in FIG. 2) and moving an empty drum from which the bung has been removed from the first station to the second, filling station. As noted above, it is preferred that these operations occur under control of the programmable controller to which control panel 34 is operably connected, but all of these operations are also conducted by manually monitoring the increase in the weight of the drum and then closing the valve 76 and retracting the filling nozzle 78 from the drum $36_2$ and so on.

At the third station, the bung is tightened, the filled, sealed drum is checked for a tight seal, and the bung is capped, all using conventional air or hydraulic-powered equipment such as is available in the art, or manually in the same manner as described above for each of the first two stations on frame 18. As the lifting balloons 56 comprising a portion of station-to-station mover 22 deflate, the filled drum $36_3$ at the third station is lowered onto a second set of powered rollers 80 located at the third station. When the motor 81 which powers rollers 80 is activated, the drum $36_3$ rolls onto the outlet conveyor 16, and by reference to FIGS. 1 and 3, it can be seen that the outlet conveyor 16 is inclined downwardly from frame 18. The drum $36_3$ exiting the third station on frame 18 therefore rolls down the "A" conveyor of outlet conveyor 16. When a sufficient number of filled, capped drums accumulates on outlet conveyor 16A as sensed by a photo eye (not shown) or as observed by the operator, a second lifting balloon 82 is inflated and the drum is raised on lifting plates 84 above the rollers 38 of outlet conveyor 16A to the height of the lift stops 86. Lifting plates 84 are mounted to a trolley 88 which moves back and forth from outlet conveyor 16A to outlet conveyor 16B under control of a lane change piston 90. When piston 90 is retracted, trolley 88 carries the filled drum from outlet conveyor 16A to the inboard outlet conveyor 16B, and when the lift balloon 82 deflates, the drum is deposited on the rollers 38 comprising outlet conveyor 16B and subsequently rolls down conveyor 16B.

From the foregoing description, it can be seen that the filling apparatus of the present invention includes inlet and outlet conveyors mounted to a base, a frame likewise mounted to the base, means for moving a container onto and off of the frame, and means mounted to the frame for moving a container from station-to-station on the frame for performing the operations of (1) positioning the opening of a container for introducing a flowable material into the container, (2) introducing the flowable material into the container through the opening, and (3) closing the container having the flowable material therein, and that each of these three operations is performed at a different station on the frame. Those skilled in the art will recognize, however, that the description set out herein is a description of the presently preferred embodiment of the invention and that other embodiments can be constructed in accordance with the teachings set out herein which, for instance, may not conduct these specific operations at each specific station. It is envisioned, for instance, that the purging of the drums before filling can be conducted at the second station (indeed, it may not be necessary to purge at all depending upon the particular flowable material with which the drum is being filled) or that the bung may be inserted and tightened in the opening into the drum at the third station instead of inserted at the second station and tightened at the third as contemplated herein.

Similarly, those skilled in the art who have the benefit of this disclosure will recognize that certain changes can be made to the component parts of the apparatus of the present invention without changing the manner in which those parts function to achieve their intended result. For instance, the specific construction of the conveyors 14 and 16 and the means that is provided for moving the drums onto and off of the frame 18 may be changed without departing from the spirit and scope of the invention. The powered rollers 44 can, for instance, be located on the frame 18 for moving the container being filled from one station to another and a pair of carriers such as the carrier 62 described herein can be used as the means described herein for moving the container onto and off of frame 18. Indeed, automated conveying and handling equipment for conducting any one of the operations described herein is likely known in the industry; the focus of the present invention being on the combination of the automated conveying and handling equipment described herein. For that reason, any combination of belts, roller, pistons, trolleys, and/or similar such equipment which accomplishes the purpose described herein is intended to fall within the scope of the present invention, regardless of whether power is supplied by electricity, hydraulics, pneumatics, or any other source. For this same reason, as noted above, operation of the various drum handling and filling equipment may be accomplished manually rather than under the control of the programmable logic controller described herein, and such a change does not depart from the scope of the present invention. All such changes, and others which will be made clear to those skilled in the art by this description of the preferred embodiments of the invention, are intended to fall within the scope of the following, non-limiting claims.

What is claimed is:

1. Apparatus for filling a container with a flowable material comprising:

a base;

inlet and outlet conveyors mounted on said base;

an elongate frame mounted to said base at an angle relative to said inlet and outlet conveyors that is approximately a right angle including (a) means for (1) spinning a container for positioning the opening of the container in alignment with means for introducing a flowable material into the container, (2) introducing the flowable material into the container through the opening, and (3) closing the container having the flowable material therein, each of said operations being performed at a different station on said frame, and (b) means for moving the container from one station on said frame to another; and means mounted to said base for moving the container onto said frame from said inlet conveyor and off of said frame onto said outlet conveyor.

2. The filling apparatus of claim 1 wherein said inlet and outlet conveyors are positioned at opposite ends of said frame.

3. The filling apparatus of claim 1 wherein the container moving means comprises a carrier for moving relative to said frame and lifting the container onto and off of said frame.

4. The filling apparatus of claim 3, wherein the carrier moves in a direction substantially parallel to the long axis of said frame.

5. The filling apparatus of claim 1 wherein the positioning means receives a container from said inlet conveyor at an angle of approximately 90° to the long axis of said frame.

6. The filling apparatus of claim 1 additionally comprising a microprocessor for controlling the movement of the container onto and off of said frame.

7. The filling apparatus of claim 6 wherein said microprocessor additionally controls the operation at each of the stations of said frame.

8. The filling apparatus of claim 1 wherein said base is mounted on a vehicle for movement from one location to another.

9. The apparatus of claim 1 wherein said container moving means maintains the position of the opening of the container when the container is moved onto said frame.

10. The apparatus of claim 1 wherein said inlet and outlet conveyors are sized so that said container moving means moves the containers off of said inlet conveyor and then onto said frame and off of said frame and onto said outlet conveyer one at a time.

11. The apparatus of claim 8 wherein said vehicle is provided with a vapor tight wall and an operator work area, said vapor tight wall separating said operator work area from said base.

12. A method of filling multiple containers with a flowable material comprising the steps of:

moving multiple containers, one at a time, onto an elongate frame from an inlet conveyor positioned at an angle of approximately 90° relative to the frame;

moving each container on the frame through a plurality of stations located along the length of the frame, the stations being adapted for performing the operations of (1) spinning the container to position the opening of the container for receiving a flow of material, (2) introducing the flowable material into the container through the opening, and (3) closing the container having the flowable material therein; and moving each container off of the frame onto an outlet conveyor positioned at an angle of approximately 90° relative to the frame.

13. The method of claim 12 wherein the position of the opening of the container is maintained after the opening is positioned for introducing the flowable material into the container as the container is moved from station to station on the frame.

14. The method of claim 12 wherein the containers are moved onto the frame from the inlet conveyor and off of the frame onto the outlet conveyor by lifting the containers.

15. The method of claim 14 wherein the containers are moved from station to station on the frame by lifting the containers off of the frame.

16. Apparatus for filling a container having an off-center opening for introducing a flowable material into the container comprising:

inlet and outlet conveyors;

an elongate frame mounted at an angle relative to said inlet and outlet conveyors that is approximately a right angle;

means for moving a container off of said inlet conveyor onto said frame, along said frame, and off of said frame onto said outlet conveyor; and means for (1) spinning the container to align the off-center opening of the container with means for introducing a flowable material into the container, (2) introducing the flowable material into the container through the opening, and (3) closing the container having the flowable material therein, each of said operations being performed at a different station on said frame as the container is moved along said frame, said container moving means maintaining the position of the opening in the container as the container is mowed from station to station.

17. The apparatus of claim 16 wherein said inlet and outlet conveyors are sized so that said container moving means moves one container off of said inlet conveyor and onto said frame and off of said frame and onto said outlet conveyor one at a time.

18. The apparatus of claim 17 wherein said container moving means separates each of the containers from each other.

19. The apparatus of claim 18 wherein said container moving means lifts the containers to move the containers along said frame.

* * * * *